United States Patent Office 3,066,080
Patented Nov. 27, 1962

3,066,080
FERMENTATION PRODUCTION OF
COENZYME Q-10
Karl A. Folkers and Harold B. Woodruff, Plainfield, N.J., assignors to Merck & Co., Inc., Rahway, N.J., a corporation of New Jersey
No Drawing. Filed Mar. 22, 1961, Ser. No. 97,443
13 Claims. (Cl. 195—96)

This invention relates to the methods of production of a certain class of quinones, known as "Coenzymes-Q," by fermentation.

This is a continuation-in-part of our copending application Serial No. 783,147, filed December 29, 1958, and now abandoned.

The Coenzymes Q are members of a class of 2,3-dimethoxy-5-methyl quinones, wherein the 6-position is substituted with a side chain varying in length from five to ten isoprenoid units linked serially "head to tail" and which are designated -Q-10, -Q-9, -Q-8, etc., according to the number of isoprenoid units. The members of this class have coenzymatic activity in the electron transport particle of the oxidative or energy producing system of heart muscle cells. (The background of this biochemical phenomenon has been summarized by one of the principal investigators, Prof. David E. Green in The Harvey Lectures [p. 177 (1956–57), Academic Press, New York].) One of these essential quinones, most particularly that one known as Coenzyme Q-10, has been discovered bound in, and has been prepared from certain living sources, especially beef heart muscle [Crane, Hatefi, Lester and Widmer, Biochim., Biophys. Acta 25, 220 (1957)]. Other quinones of this class having side chains of varying lengths have also been prepared from living sources and are also effective in this enzyme system as measured by the oxidative respiration of mitochondrial preparations.

The present invention makes possible the preparation of the essential quinone known as Coenzyme Q-10 in substantial, commercially significant quantity by means of fermentations which may be conducted on a suitably large scale (e.g. in submerged culture which may be aerated and stirred vigorously). Formerly Coenzyme Q-10, the coenzyme from heart muscle tissue, was available only by preparation from such tissue by arduous methods and at relatively great expense due to the considerable cost of this source material, and the tedious processing required.

The fermentation process may be varied according to the specific inoculating organism, the growth and metabolic processes of which influence the amount and specific type of Coenzyme Q which may be produced, the nutrient medium employed, the time and temperature of the fermentation, the mechanics of handling the resulting broth and steps of isolation of the desired end-product, which is a substituted quinone known as Q-10.

In carrying out the process of this invention, the nutrient medium required is prepared using a source of assimilable carbon such as a carbohydrate, for example pure sucrose or brown sugar, dextrose, maltose, lactose, beet molasses, as well as rye, hydrol, ribose, dried whey, or cottonseed meal. A source of assimilable nitrogen which may be selected from nitrogen containing compounds and complexes such as pure or degraded proteins, amino acids, distillers solubles, corn steep liquor, yeast autolysate, soybean meal, urea and the like, and including inorganic ammonium compounds, and inorganic nitrogen containing compounds is added to the medium.

Ordinarily, from 1 to 10% assimilable carbon source may be employed; the percentage necessarily varies with the characteristics of the compound or crude source taken for use. The assimilable nitrogen source may be used at a concentration of about 0.1% of the medium, but necessarily this will vary considerably due to the nature of the pure compound or crude source employed.

Certain mineral nutrients may be required depending on the culture employed for inoculation. It is desirable to add sources of potassium, sulfur and phosphorus, and traces of zinc, iron, manganese, and magnesium. When the culture is prepared from refined materials, it may be essential to add any or all of these elements; however, when technical or crude sources of assimilable carbon and nitrogen are employed, trace elements may be present in sufficient quantity. The additions may be made in the form of any available and suitable salt such as the nitrates, chlorides, sulfates, and the like.

The amount of Coenzyme Q-10 resulting in the fermentation broth may be higher if relatively higher concentrations of certain of these nutrients are used, but, as is common in the art, a definite relationship cannot be formally stated mathematically as in an arithmetic or algebraic formula.

After preparing the medium in water solution in sterile condition and cooling if necessary, it is inoculated with a culture of one of the suitable strains of bacteria, examples of which have now been found among the members of the genus Pseudomonas or members of the genus Proteus.

In order to discover which of the species of these certain genera may be suitably employed for growth and production of Coenzyme Q-10 by fermentation, the organism is commonly grown in shake flasks which are agitated and aerated by a rotary shaker for a period of time from ten to one hundred hours, after which the resulting broth is cooled, and filtered or centrifuged depending on the suitability of either procedure.

The solids are collected and then hydrolyzed with alcoholic potassium hydroxide by boiling under reflux, in order to release the Coenzyme Q from the cells.

The present invention anticipates the possibility of hydrolyzing the entire broth as well as the separated solids.

The mixture resulting from the hydrolytic treatment is cooled and extracted with light petroleum fraction, and the extract is dried and a solution made up for application of the modified Cravens test hereinafter described, which is a color test to which alkoxy-substituted quinones generally respond by production of a blue color.

Organisms which produce considerable amounts of Coenzyme Q as judged by this assay may be employed to produce inocula. In particular those organisms are selected which produce that coenzyme known as Q-10 in high yield. Specifically these have been discovered by taking culture extracts, obtained as specified above, and comparing these with known standards of Coenzyme Q-10 on a paper chromatographic system by means of developing the spots on the papers, which are coated with Vaseline as a non-mobile phase, with selected solvent systems such as dimethyl formamide containing carefully controlled trace amounts of water. After development, the papers are inspected for the location of yellow spots, and are sprayed with dyes to further intensify the spot in question if desired, thereby identifying the Coenzyme Q which is present. Cultures of bacteria thus identified which produce the Coenzyme Q-10 are selected for growth in suitable media.

Specifically, it has been discovered that cultures of the genus Proteus such as *Proteus vulgaris* (strain 3307, H-form) a living culture of which has been in the American Type Culture Collection (ATCC 6897) can produce Coenzyme Q-10. By the same means, it has been discovered that cultures from the genus Pseudomonas, such as *Pseudomonas denitrificans*, a culture of which has been deposited in the Northern Regional Research Laboratories type culture collection, and designated as NRRL-B-1665, and which has the characteristics of this species as described in Bergey's Manual of Determinative Bacteriology (sixth edition, Breede, Murray and Hitchins), a Pseudomonas, a living culture of which has been deposited in the American Type Culture Collection, No. 13283, *Pseudomonas azotocolligans* ATCC 12417, *Pseudomas diminuta* ATCC 11568, *Pseudomonas woodsii* ATCC 9655, *Pseudomonas tomato* ATCC 10862, and *Pseudomonas vitiswoodrowii* ATCC 11636 produce Coenzyme Q-10 when grown and assayed as specified hereinbefore.

It is to be understood that this invention is intended to include also those mutant strains which may be discovered and produced from the species of the genus Proteus and the genus Pseudomonas by ultraviolet irradiation, X-ray radiations, treatment with nitrogen mustard type compounds, other physical and chemical treatments, and spontaneous mutations as are commonly used and found in the art.

After inoculating the growth medium prepared for this process with a culture of such bacteria, the batch is preferably, though not necessarily, aerated and stirred or shaken vigorously, under otherwise sterile conditions to prevent contamination, at temperatures between 15 and 50° C., preferably within 27–37° C., for periods of ten hours to ten days, depending on the rate of growth achieved. After fermentation is reasonably complete, as judged by density of growth or other suitable means, the cells and broth are harvested by stopping aeration and agitation, and then filtering or centrifuging down the cellular material. The cellular material is then processed by hydrolysis in the presence of alcoholic alkali and pyrogallol, and extracted with a solvent, which is usually a fraction of petroleum similar to a hexane cut; the organic solvent extracts are washed, dried, filtered and concentrated, thereby leaving a relatively crude residue of the quinone form of Coenzyme Q-10.

This crude residue containing Coenzyme Q-10 may be assayed by one of a number of means, such as the modified Cravens test (production of a blue color by action of ethyl cyanoacetate and alkali in ethanolic solution), paper chromatographic procedures, and the differential in intensity of light absorption at 275 m$\mu$ before and after reduction with such reagents as sodium borohydride.

Without departing from the scope of the present invention, it is possible to hydrolyze the total broth produced by the fermentation, although it is ordinarily preferred to keep the total volumes smaller by hydrolyzing only the solids such as the cellular material, because the available Coenzyme Q produced by fermentation usually resides therein.

The cells in the broth may also be broken by lysis, prior to application of any hydrolysis step.

The present invention anticipates the possibility of hydrolysis with other acid or alkaline reagents, including protection of the Coenzyme Q-10 during this treatment by antioxidants other than pyrogallol, or reducing agents such as a metal-and-acid -alkali combination, hydrides and the like, or omission of such agents in favor of use of a protection atmosphere of non-reactive but oxygen-excluding gas such as nitrogen, or maintenance of a reducing atmosphere such as hydrogen.

The present invention also anticipates direct extraction without prior hydrolysis since solvent treatments, agitation with chloroform, acetone, alcohol, and the like, singly or mixed, have been found in the art to directly lyse cell walls and release cell constituents.

The organic solvent extracts, obtained by such means applied in any combination, upon evaporation leave a relatively crude concentrate of Coenzyme Q-10, which is of sufficient purity for direct application to crude mixtures such as feed-stuff supplements, and in the reduced form (hydroquinone of Coenzyme Q-10) as antioxidants, such as hydroquinones being generally recognized as useful in the art of supplementation designed to prevent devopment of rancidity and the like in commercially supplied fats, oils and the like. This quinone, being a bound constituent of mammalian tissue, is even the more acceptable therein.

Such relatively crude preparations may be further purified by chromatographic procedures using one or several of the various adsorbents useful in the art, such as the alumino-silicates, of which Florisil and Decalso are commercial examples, or alumina, or silica gel, together with eluting solvents which are petroleum fractions admixed with more polar solvents such as ethers, chloroform, halogenated solvents, benzene, ketones or alcohols as the polarity of the adsorbing agent requires. In the case of partition chromatography, hydrophobic supports may be prepared by known techniques from many diverse materials such as silica gel, rubber powder, cellulose or diatomaceous earths, and the eluting solvents must be of a more polar, but immiscible, nature such as alcohols, amides, and the like, while the supported solvent phase is chosen from non-polar types such as benzene, petroleum fractions and the like.

Another technique which can effect substantial purification is countercurrent extraction with solvent phases such as dimethylformamide containing water and petroleum fractions. The final eluates or concentrates may be purified by crystallization from solvents in which the solubility range at low temperatures is useful, specific examples being acetone or ethanol. Substantially pure Coenzyme Q-10 thereby obtained as an orange-yellow solid melting in the range of 47–50° C. Such crystalline preparations are recognized as pure Coenzyme Q-10 by differentiation from other "Coenzymes Q" (Q-9, Q-8, etc.) by means of paper chromatography, and infrared and nuclear magnetic resonance spectra which are indistinguishable from those of other pure samples of authentic Coenzyme Q-10 prepared from beef heart muscle.

The following examples are intended to be illustrative, but not restrictive, of our invention. It is to be further understood that many modifications are possible in the inoculating organism used, the nutrient medium in which the selected organism is grown, the technique of fermentation applied, and the detailed procedure of isolation of the Coenzyme Q-10 produced, without departing from the spirit and scope of this invention.

EXAMPLE 1

A nutrient medium known as "Meat–27" was prepared with the following ingredients:

| | G. |
|---|---|
| Commercial enzymatic digest of casein (N-Z-Amine) | 1 |
| Dextrose | 1 |
| Commercial meat extract (Difco) | 0.5 |
| Sodium chloride | 0.5 |
| Water, q.s. 100 ml. | |

After sterilization by heat (autoclaved with steam at 15 lbs. per sq. in. gauge pressure and cooled), a 250 ml. flask containing 50 ml. of medium was inoculated aseptically with a true culture of *Proteus vulgaris* ATCC 6897 and agitated under otherwise sterile conditions at approximately 28° C. for about 24 hours on a rotary shaking table. This subculture was then distributed in portions as inoculum to twenty sterile flasks, which contained approximately 50 ml. each of "Meat-27" medium prepared as above. These were then incubated at approximately 28° with aeration and agitation on a rotary shaker for sixty to seventy hours.

The broth produced (940 ml. altogether was collected) was centrifuged and the collected cellular solids dried (1.73 g. of dry wt.). This material was hydrolyzed with a mixture of 50 ml. of water, 100 ml. of 10% potassium hydroxide in ethanol, and 4 g. of pyrogallol, by refluxing 30 minutes. The mixture was cooled, and extracted three times with 100 ml. portions of Skellysolve B. The combined organic extracts were concentrated to a residue by a current of air in the hood, taken up in 5 ml. of 95% ethanol, and the modified Craven's colorimetric test was applied as follows:

*Method for Colorimetric Determination ("Modified Craven's Test")*

To 4 ml. of the above solution in alcohol to be assayed was added 1 ml. of ethyl cyanoacetate and 1 ml. of 0.2 N potassium hydroxide solution. A blue color developed, indicating a positive test, and was read thirty minutes after the addition of reagents in a Lumitron colorimeter, using a blue filter which passes the 620 m$\mu$ wavelength of visible light. The reading obtained was 62, which was compared to standard curves determined from application of this test to authentic Coenzyme Q–10, and showed a content of 250 micrograms of equivalent Coenzyme Q in the total sample obtained, or 144.0 micrograms per gram of dried cellular material.

EXAMPLE 2

*Proteus vulgaris* ATCC 6897 was fermented as in Example 1, using the medium "Meat–27" as in Example 1, and the cellular material produced was collected; the dry weight was 2.11 g. This dry cellular material was hydrolyzed with alcoholic potassium hydroxide and pyrogallol, and extracted with Skellysolve B as set forth in Example 1. The extracts were concentrated and examined by paper chromatography.

*Method for Paper Chromatography*

Whatman No. 1 paper is impregnated with Vaseline by passing the sheet through a 5% solution of Vaseline in petroleum ether and allowing it to dry. The paper is cut into circles about 30 cm. in diameter and a circular hole of about 1–1.5 cm. is bored in the center. The samples to be tested are taken up in a suitable solvent and applied as small spots on points of a circle drawn concentric with the center hole. Standards of known Coenzyme Q–10 are also applied, both alone, and admixed with the sample to be tested. Approximately 30 micrograms are required if the material is visualized as a yellow spot. As little as 3 micrograms can be seen under an ultraviolet light as a dark (ultraviolet-absorbing) area. After application of the test spots and drying, the papers are developed by placing them horizontally in a glass chamber supported by the outer edges of the circle. (This is conveniently accomplished by placing on a "Pyrex" glass pie plate with ground edges and covering with a similar plate, inverted.) Solvent for development is prepared by adding from one to three percent water to dimethyl formamide, and this solution is saturated by shaking with Vaseline. This solvent is placed in a cup below the paper, and a wick made of a strip of untreated paper rolled into a short tube is inserted through the center hole into the solvent (thereby feeding the sheet with solvent by means of rising capillary action). The sheet is afterward dried and inspected visually, and, if necessary, under ultraviolet light. If further intensification of a spot is desired, it may be sprayed with a reduced solution (leuco-) of methylene blue dye, which is rapidly oxidized by quinone of this type to give a blue spot (approximately one microgram of Coenzyme Q–10 may be detected in this way). Depending on the percentage of water in the developing solvent, Coenzyme Q–10 has an $R_f$ of 0.2 to 0.6.

When the extract obtained by fermentation of *Proteus vulgaris* ATCC 6897 was examined by the technique of circular paper chromatography and compared to authentic samples of Coenzyme Q–10, on such a paper developed with dimethyl formamide containing 2% of water, there was found a distinct yellow zone having $R_f$ .33, not resolved when admixed with known Coenzyme Q–10, thereby demonstrating the identity of the material prepared by fermentation with that Coenzyme Q–10 obtained from beef heart muscle.

EXAMPLE 3

By the method of Example 1, a series of flasks containing "Meat–27" medium was inoculated with Pseudomonas sp. ATCC 13283 from a culture grown for 21 hours at 28° C. in a shake flask as illustrated above. After a series of twenty flasks thus inoculated, each containing approximately fifty ml. of medium, had been agitated on a rotary shaking machine for 68 hours at 28° C., 940 ml. of broth was harvested and the dried cellular material weighed 2.60 g. It was processed as in Example 1, yielding a test solution which was assayed by the colorimetric determination of Example 1. The colorimeter reading of 7.0 indicated a content of over 1000 micrograms of Coenzyme Q in the total sample, or more than 376 micrograms per gram dry weight of cells.

EXAMPLE 4

A fermentation of Pseudomonas sp. (ATCC 13283, as hereinbefore specified) was run in approximately 1 liter altogether of "Meat–27" medium by the procedure of Example 3. After 66 hours, the cellular material was harvested as exemplified before, and dried, 2.56 g. being obtained. This residue was worked up by means of the alkaline hydrolysis procedure illustrated in Example 1, and the Skellysolve extracts were examined by the paper chromatographic method illustrated in detail in Example 2. The paper chromatogram was run with known standards of authentic Coenzyme Q–10, and the developing solvent used was dimethyl formamide containing 1% water. When the paper circle was fully developed, the sample tested was found to have a yellow spot not resolved from that of authentic Coenzyme Q–10, the $R_f$ observed being 0.51 in the case of this solvent mixture.

EXAMPLE 5

A culture of *Pseudomonas denitrificans* NRRL B–1665 was prepared by inoculating 50 ml. of sterile Difco nutrient broth in a 250 ml. flask under otherwise sterile conditions with a pure culture of this bacterium, and agitating it for 24 hours on a rotary shaker table at 28° C.

The broth so prepared was then used as inoculum for twenty flasks similarly prepared, each containing approximately 50 ml. of sterile Difco nutrient broth. These were agitated for 60 hours on a rotary shaker table at 28° C. Approximately one liter of whole broth so obtained was harvested, the cellular material was separated by centrifugation, and dried; wt., 1.01 g.

This was treated by the alkaline hydrolysis and Skellysolve extraction procedure given in detail in Example 1. The extracts when dried were tested by the colorimetric determination given in Example 1. The photometer reading was 79.8 which is equivalent to 30 micrograms of Coenzyme Q–10 according to the standard curves prepared from tests on authentic samples of this quinone, or 30 micrograms per gram of dry cell weight.

EXAMPLE 6

A variety of media, including crude and pure ingredients may be used for production of Coenzyme Q–10 by fermentation. A nutrient medium is prepared by combining the following ingredients with one liter of water.

| | |
|---|---|
| Beet molasses | g 120 |
| $(NH_4)_2HPO_4$ | g 6 |
| $MgSO_4 \cdot 7H_2O$ | g 1 |
| $MnSO_4 \cdot 4H_2O$ | g 0.2 |
| $ZnSO_4 \cdot 7H_2O$ | g 12.5 |
| $Na_2MoO_4 \cdot 2H_2O$ | mg 5 |

After making up with distilled water, the pH is adjusted to 7.5; then the medium is sterilized by application of steam at 15 pounds per sq. in. gauge pressure for at least 20 minutes, and cooled. (This may be conveniently done after distribution of aliquots into shake flasks.)

The flasks, after adding medium and sterilization, are inoculated with a pure culture of suitable strain of *Pseudomonas denitrificans*, such as NRRL B-1665, under aseptic conditions. After allowing growth to proceed for sixty to one hundred hours, while the flasks are agitated on a rotary shaker at 28° C., the broth is harvested. A typical run gave, from 1000 ml. of harvested broth, 19.9 g. of dry cellular material, which when worked up by the procedures exemplified hereinbefore yielded 41.4 mg. of Coenzyme Q-10 as determined by colorimetry and paper chromatography.

EXAMPLE 7

A synthetic medium is prepared from the following ingredients in one liter of distilled water:

| | |
|---|---|
| Sucrose | g-- 30 |
| Monosodium glutamate | g-- 5 |
| $(NH_4)_2HPO_4$ | g-- 4 |
| $MgSO_4$ | g-- 4 |
| KCl | g-- 0.091 |
| $Na_2MoO_4$ | mg-- 5 |
| $FeSO_4 \cdot 7H_2O$ | mg-- 20 |

The medium is adjusted to pH 6.5 to 6.8 before sterilization under the conditions of Example 6. After inoculating with a suitable pure culture selected from the genus Pseudomonas, such as *Pseudomonas dinitrificans* (NRRL B-1665), the fermentation is conducted according to the procedure of Example 6. The Coenzyme Q-10 produced is isolated as crude extract and determined by the procedures of Examples 1 and 2.

From a sample of 995 ml. of harvested broth, the dried cellular material weighed 3.9 g. When this was treated by the procedures exemplified hereinbefore, 3.95 mg. of Coenzyme Q-10 was found by colorimetry and paper chromatography.

EXAMPLE 8

A nutrient medium is prepared from the following ingredients in 1 liter of distilled water:

| | |
|---|---|
| Soy peptone | g-- 10 |
| Dextrose | g-- 30 |
| $(NH_4)_2HPO_4$ | g-- 4 |
| $MgSO_4$ | g-- 1 |
| KCl | g-- 0.091 |
| $Na_2MoO_4$ | mg-- 5 |
| $FeSO_4 \cdot 7H_2O$ | mg-- 20 |

This medium is adjusted and sterilized as in the previous examples and inoculated under aseptic conditions with a suitable strain of Pseudomonas, such as *Pseudomonas denitrificans* NRRL B-1665.

After fermentation as exemplified hereinbefore, the harvested broth from a run amounted to 995 ml., from which 4.25 g./l. of dry cellular material was obtained. When this was worked up by the procedures exemplified above, 4.5 mg. of Coenzyme Q was shown to be present by colorimetric assay.

EXAMPLE 9

A nutrient medium is prepared from the following ingredients in one liter of distilled water:

| | G. |
|---|---|
| Crystalline dextrose | 50 |
| Commercial yeast extract (Difco) | 10 |

The medium is adjusted to pH 7.0 before sterilization. By the techniques exemplified above, it is inoculated under aseptic conditions with a suitable strain of Pseudomonas sp., such as *Pseudomonas denitrificans* NRRL B-1665, and after sixty hours to ten days of agitation at approximately 28° C., the cellular material is harvested.

From a typical run, one liter of harvested broth yielded 9.4 g. of dry cellular material. When this was worked up by the procedures exemplified above, 5.7 mg. of Coenzyme Q-10 was found by colorimetry and paper chromatography.

EXAMPLE 10

This example illustrates commercial, large scale production. A nutrient medium is prepared by combining the following ingredients:

| | |
|---|---|
| Beet molasses | g-- 1,250 |
| $(NH_4)_2HPO_4$ | g-- 20 |
| $Mg \cdot SO_4 \cdot 7H_2O$ | g-- 10 |
| $MnSO_4 \cdot 4H_2O$ | g-- 2 |
| $ZnSO_4 \cdot 7H_2O$ | g-- 0.2 |
| $FeSO_4 \cdot 7H_2O$ | g-- 0.2 |
| $Na_2MoO_4 \cdot 2H_2O$ | mg-- 50 |

These are made up to a volume of ten liters with pure water, the pH is adjusted to 7.5, and the batch is sterilized by application of live steam at 120° C., 15 lbs. per sq. in. gauge pressure, for not less than thirty minutes.

The whole batch, contained in a sterile fermentation chamber arranged for vigorous stirring and simultaneous aeration with a vigorous stream of sterile air, is brought to a temperature substantially less than 40° C., and inoculated under otherwise sterile conditions with the whole contents of a shake flask or flasks containing about 500 ml. of a broth of vegetative growth of the pure strain of the organism selected, grown substantially as illustrated in Examples 1, 2, 3, 4 and 5.

The batch is aerated and stirred vigorously for approximately two days, depending on the rate of growth achieved, at about 28° C. When the growth is sufficient, as judged by density of cellular material, the contents of this fermenter are then used as inoculum for a larger batch, as follows:

Medium is prepared for one thousand liters substantially as described above, but using larger quantities:

| | |
|---|---|
| Beet molasses | kg-- 60 |
| $(NH_4)_2HPO_4$ | kg-- 5 |
| $MgSO_4 \cdot 7H_2O$ | kg-- 1 |
| $MnSO_4 \cdot 4H_2O$ | g-- 200 |
| $ZnSO_4 \cdot 7H_2O$ | g-- 20 |
| $FeSO_4 \cdot 7H_2O$ | g-- 20 |
| $Na_2MoO_4 \cdot 2H_2O$ | g-- 5 |

These ingredients are combined, in a two to three thousand liter fermentation vat, arranged for vigorous stirring and aeration by means of the usual turbines, rotors, spargers, and baffles. They are combined and made up the volume with approximately one thousand liters of suitably pretreated purified water, either in the fermenter vessel, or a separate vat, and sterilized prior to introduction into such a sterile fermentation vat, or sterilized in situ by the above-illustrated means. The pH is adjusted to 7.0 to 7.5 before sterilization. After cooling the medium to less than 40° C., a sterile transfer of the inoculum prepared above, of which volumes of fifty to one hundred liters are usually used, is made into the large fermenter. The one thousand liters of medium plus inoculum introduced is stirred and aerated vigorously which depends on the strain chosen, for periods of one to ten days at temperatures of 28-30° C. At periods of time, usually varying between 1 and 4 days of fermentation time, sterile addition of about 60 kg. more of beet molasses and 3 to 5 kg. more of diammonium hydrogen phosphate usually promotes greater growth per unit volume, thereby effecting substantial economies. After the batch has achieved a sufficient density of vegetative growth, the cellular material is harvested by conventional means.

EXAMPLE 11

Cells of *Pseudomonas denitrificans* obtained in large scale fermentation were centrifuged from whole broth; in all, 275 g. of moist cellular material was obtained (this was equivalent to 75 g. of dry weight). The moist cake was mixed with 25 g. of pyrogallol and 400 ml. of ethanol (2% benzene, absolute) and 100 g. of potassium hydroxide in a one liter flask and the mixture was boiled under reflux for one hour, cooled in an ice bath for one-half hour, diluted with 300 ml. of water and extracted three times successively with 800 ml. portions of light petroleum, such as Skellysolve B. These combined extracts were washed twice with 300 ml. portions of water, dried over anhydrous sodium sulfate, and filtered. Concentration of the filtrate by removal of all the solvent in vacuo left an orange residue, wt. 760 mg., of crude oily extract containing Coenzyme Q–10.

*Assay by Differential Ultraviolet Absorption*

A small aliquot of such crude extract (chosen so that about 1 mg. of pure Coenzyme Q–10 is taken) is made up in solution in pure ethanol. (A volume of twenty-five ml. is convenient.) About 10 ml. of such solution is treated with an excess (10–20 mg.) of solid sodium borohydride. After thorough agitation for about one minute, reduction is complete and the suspended solids are centrifuged. The optical density at 275 m$\mu$ of this supernatant solution of the reduced form is then determined in a suitable spectrophotometer such as a Beckman Model DU. The optical density of the untreated solution is also thus determined at 275 m$\mu$. From the densities obtained, the E% values of both oxidized and reduced forms are determined. The differential in E% is approximately 140 for pure Coenzyme Q–10, when measured at 275 m$\mu$ as above. When the differential found for the unknown sample is multiplied by $$\frac{100}{140}$$

it is clear that the percent content of equivalent Coenzyme Q–10 is the result.

When this method was applied to the crude oil obtained above, it was found to show a differential absorption equivalent to a content of 134 mg. of Coenzyme Q–10.

*Chromatography on Alumino-Silicate Adsorbents*

A solution of 680 mg. of the orange oily residue obtained as described above in ten milliliters of light petroleum fraction (Skellysolve B) was poured on to a chromatographic column of 11 g. of alumino-silicate adsorbent (Florisil) (60 to 100 mesh) packed in a 1 cm. diameter tube in Skellysolve B. After the solution had run into the column, elution was continued with Skellysolve B, and further elution with mixtures of diethyl ether and Skellysolve B. The fractions obtained are shown in the tabulation below:

| | Fraction Volume in ml. | Developing Solvent | Color |
|---|---|---|---|
| Fraction 1 | 125 | 125 ml. Skellysolve B | colorless. |
| Fraction 2 | 100 | 100 ml. of 5% ether-95% Skellysolve B. | pale yellow. |
| Fraction 3 | 80 | 100 ml. of 50% ether-50% Skellysolve B. | orange. |

All fractions were evaporated separately, leaving oily residues. Fraction 3 contained the Coenzyme Q–10; a determination by the differential ultraviolet absorption method given above indicated the presence of 134 mg. of Coenzyme Q–10 in this fraction.

A solution of the residue from fraction 3 described above was made in 3 ml. of Skellysolve B. It was applied to the top of a column made by packing 1.5 g. of alumino-silicate adsorbent (Decalso, 50 mesh and finer) in a column 0.5 cm. in diameter in Skellysolve B. The column was eluted with Skellysolve B and ether-Skellysolve B as tabulated below:

| Developing Solvent | Fraction No. | Vol. in ml. | Color |
|---|---|---|---|
| 45 ml. of Skellysolve 5 | 1 | 15 | colorless. |
| (40 ml. of 5% ether-95% Skellysolve B) | 2 | 10 | orange. |
| Do | 3 | 40 | pale yellow. |
| Do | 4 | 20 | colorless. |

*Isolation of Crystalline Coenzyme Q–10*

Fraction 2 from the column described above was concentrated to an oily residue which was dissolved in one milliliter of acetone. The solution was kept in an ice bath for four hours. A little material may also be recovered from fraction 3. The orange-yellow crystals deposited were collected and recrystallized twice from acetone in the same way. This yielded 67.8 mg. of pure Coenzyme Q–10 as orange-yellow solid of melting point 47–48°. This material was demonstrated to be identical with Coenzyme Q–10 prepared from beef heart muscle by the following observations:

*Analysis.*—Calcd. for $C_{59}H_{90}O_4$: C, 82.08; H, 10.51. Found: C, 82.12; H, 10.70.

Ultraviolet absorption spectrum in ethanol; oxidized (quinone) forms: $\lambda_{max.}$ at 275 and 410 m$\mu$.

$E_{1\ cm.}^{1\%}$

Found: 163 at 275 m$\mu$. Differential E% at 275 m$\mu$ (absorption of oxidized form minus absorption of reduced form): 137.

Paper chromatography by the method given in Example 2 showed this material not resolvable from authentic Coenzyme Q–10 prepared from beef heart muscle. The infrared and nuclear magnetic resonance spectra of the sample prepared above were identical with the corresponding spectra determined on Coenzyme Q–10 prepared from beef heart muscle.

EXAMPLE 12

A medium was prepared with the following ingredients:

| | G. |
|---|---|
| Commercial enzymatic digest of casein (N-Z-Amine) | 1 |
| Dextrose | 1 |
| Sodium chloride | 0.5 |
| Water, q.s. 100 ml. | |

After sterilization in an autoclave at 15 lbs. per sq. in. gauge pressure, a 250 ml. Erlenmeyer flask containing 50 ml. of the above medium was inoculated aseptically with a scraping from a slant culture of species of Pseudomonas listed below and incubated for 24–48 hours at 28° C. or 37° C. on a shaking machine. Then twenty 250 ml. Erlenmeyer flasks containing 50 ml. of a medium consisting of 1% yeast extract and 3% dextrose were sterilized and inoculated with 0.5 ml. of the inoculum prepared as described above and incubated on a shaking machine at 28° C. or 37° C. for 1–3 days until good growth was obtained. The growth from each culture was then pooled for determination and characterization of Coenzyme Q.

The following microorganisms were grown in this manner:

*Pseudomonas azotocolligans* ATCC 12417
*Pseudomonas diminuta* ATCC 11568
*Pseudomonas woodsii* ATCC 9655
*Pseudomonas tomato* ATCC 10862
*Pseudomonas vitiswoodrowii* ATCC 11636

About 1 liter quantities of each of the culture broths obtained by the fermentation of each of the species of Pseudomonas identified above were centrifuged and the cells suspended in about 50 ml. of water.

The cell suspension from a given culture was diluted with an equal volume of ethanol. Five grams of pyrogallol and 10 g. of sodium hydroxide were added and the mixture was refluxed one-half hour. The mixture was extracted three times with 100 ml. volumes of hexane. The solvent extracts were combined, washed twice with 50 ml. portions of water, and then concentrated in vacuo to dryness.

Quantitative Coenzyme Q determinations and papergrams were performed using such concentrates. The technique for papergram analysis is described in the paper, Coenzyme Q, XVII, Arch. Biochem. Biophys., 89, 318–321 (1960). The spectophotometric assay used is described in the paper by Linn et al. in the J.A.C.S., volume 81, pp. 4008–4009 (1959).

In each of the concentrates prepared from the culture broths, Coenzyme Q–10 was found to be present by the papergram procedure referred to above. The spectrophotometric assays for total Coenzyme Q on the concentrates obtained from the broths were as follows:

| | $\gamma Q\ (\Delta UV)$ |
|---|---|
| Pseudomonas azotocolligans | 240 |
| Pseudomonas diminuta | 840 |
| Pseudomonas woodsii | 1200 |
| Pseudomonas tomato | 74 |
| Pseudomonas vitiswoodrowii | 110 |

What is claimed is:

1. A process which comprises cultivating a Coenzyme Q–10 producing strain selected from the genera Pseudomonas and Proteus in aqueous media containing assimilable sources of carbon, nitrogen and essential inorganic salts until a demonstrable amount of a Coenzyme Q–10 has been formed.

2. A process as in claim 1 wherein Coenzyme Q–10 is recovered from the fermentation broth.

3. A process as in claim 1 wherein the microorganism is *Proteus vulgaris* ATCC 6897.

4. A process as in claim 1 wherein the microorganism is *Pseudomonas* sp. ATCC 13283.

5. A process as in claim 1 wherein the microorganism is *Pseudomonas denitrificans*.

6. A process as in claim 1 wherein the microorganism is *Pseudomonas azotocolligans*.

7. A process as in claim 1 wherein the microorganism is *Pseudomonas diminuta*.

8. A process as in claim 1 wherein the microorganism is *Pseudomonas woodsii*

9. A process as in claim 1 wherein the microorganism is *Pseudomonas tomato*.

10. A process as in claim 1 wherein the microorganism is *Pseudomonas vitiswoodrowii*.

11. A process for producing Coenzyme Q–10 which comprises cultivating a Coenzyme Q–10 producing strain selected from the genera Pseudomonas and Proteus in an aqueous medium containing assimilable sources of carbon, nitrogen and essential inorganic salts until a demonstrable amount of Coenzyme Q–10 has been formed, and recovering the Coenzyme Q–10 therefrom.

12. The process as in claim 11 wherein said recovery involves adding an organic solvent to the broth to isolate the Coenzyme Q–10 by extraction.

13. The process as in claim 11 wherein said recovery involves separation of the cellular solids from the broth, hydrolysis of the solids by an alcoholic alkali in the presence of a deoxidizing agent, extraction with the use of an organic solvent, chromatography to isolate the Coenzyme Q–10, and its crystallization.

References Cited in the file of this patent

UNITED STATES PATENTS 2,781,339    Mitz et al. _____ Feb. 12, 1957